United States Patent [19]
Friedrich

[11] 3,915,194
[45] Oct. 28, 1975

[54] CONDUIT COLUMN ASSEMBLY FOR HYDRAULIC VALVES

[75] Inventor: Manfred Friedrich, Huelchrath, Schloss, Germany

[73] Assignee: Abex Corporation, New York, N.Y.

[22] Filed: Jan. 14, 1974

[21] Appl. No.: 433,166

[30] Foreign Application Priority Data
Jan. 18, 1973 Germany............................ 2302267

[52] U.S. Cl................... 137/608; 137/271; 251/367
[51] Int. Cl.².......................................... F16K 27/00
[58] Field of Search.................... 137/608, 271, 270; 251/367, 366

[56] References Cited
UNITED STATES PATENTS

| | | | |
|---|---|---|---|
| 2,651,324 | 9/1953 | Hodgson et al.................. | 137/271 X |
| 3,504,704 | 4/1970 | Beckett et al.................... | 251/367 X |
| 3,589,387 | 6/1971 | Raymond......................... | 137/608 X |
| 3,654,960 | 4/1972 | Kiernan .......................... | 137/271 X |

*Primary Examiner*—Charles J. Myhre
*Assistant Examiner*—Ira S. Lazarus
*Attorney, Agent, or Firm*—David A. Greenlee; Thomas S. Baker, Jr.

[57] ABSTRACT

A manifold assembly for hydraulic valves comprises a plurality of identical blocks having symmetrically arranged through fluid passages and through- and threaded-fastening bores; by inverting alternate blocks, fluid passages are aligned and fastening bores are aligned to enable adjacent blocks to be interconnected by bolts. Each block further includes branch fluid passages extending to the sides thereof for connection to valves mounted thereon. In this manner, any number of valves having different functions can be mounted together in a single manifold assembly formed around identical mounting blocks.

4 Claims, 7 Drawing Figures

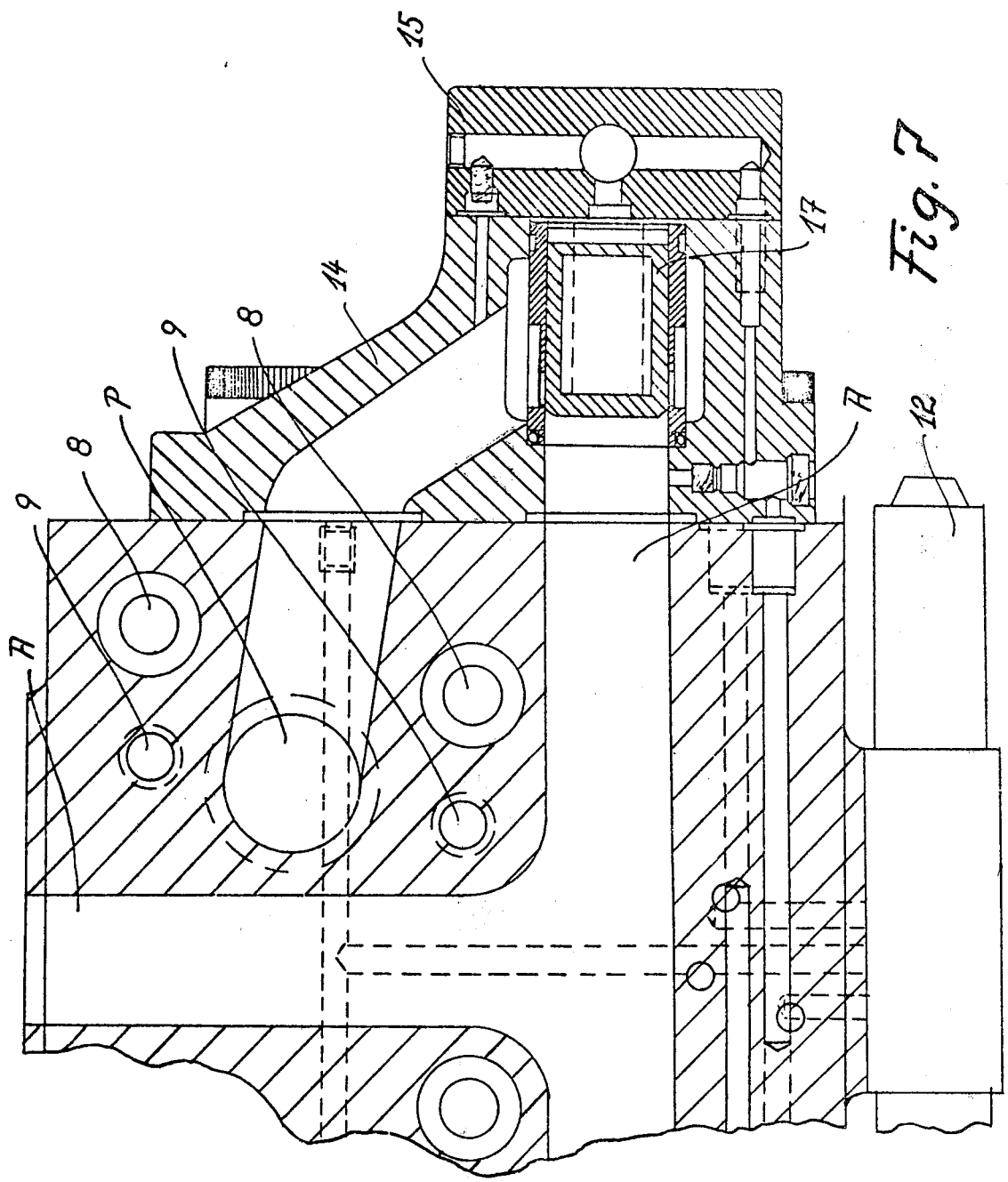

CONDUIT COLUMN ASSEMBLY FOR HYDRAULIC VALVES

This invention relates generally to hydraulic manifold assemblies for hydraulic valves, and more particularly to such a manifold assembly having exteriorly mounted valves.

In one conventional valve manifold assembly, several blocks are mutually connected by tie rods extending through corresponding mutually aligned through-bores in all of the blocks. In block assemblies of this type, the block stack height is limited by the length of the tie rods. For large stack heights using long rods the height is so great that leakage may occur at the block joint faces. Furthermore, removal of the tie rods causes disassembly of all the blocks.

In another conventional manifold block assembly, the blocks have exterior flanges that are bolted together. Since these bolts have relatively large mutual spacings, high bending moments on the flanges will result from high fluid pressure and sealing the block interfaces becomes a problem. Further, the blocks must have a minimum thickness to enable insertion of the bolts between the flanges.

The current trend in the manufacture of complicated hydraulic valves, such as multiway valves having a plurality of functions, is to assemble individual poppet valves in a common block to provide an assembly having maximum compactness. In these multiway valves a manifold block contains not only the pilot and operating passages but also the bores for receiving the valves. Although theoretically this solution offers many advantages, there are several drawbacks in the manufacturing process, such as close tolerances and complicated machining.

It is the object of this invention to provide a manifold block assembly comprising a plurality of blocks which is not limited in size and operating pressure by the number of blocks used.

In accordance with the present invention, this object is achieved by providing fastening means which join only adjacent blocks. All blocks are identical and a stack is formed of alternately inverted, or rotated, blocks so that opposite faces are mated. Each block includes a pair of through fluid conduits arranged symmetrically about a plane passing through the block. A plurality of pairs of through- and threaded-fastening bores are formed in each block symmetrically about the symmetry plane so that a through-bore aligns with a threaded-bore in the adjacent inverted blocks. A bolt is used with these bores to clamp a block pair together. This eliminates excessive bending moments and excessive tie rod length. The fastening bores are located near the fluid conduits, which reduces the sealing problem.

The blocks themselves do not contain any valves. All valves, such as pilot, servo and poppet, are mounted exteriorly at the block side surfaces and are connected via branch fluid conduits to the through conduits.

A much better understanding of this invention may be had by reference to the following detailed description of the attached drawings in which:

FIG. 7 is a sectional view taken along the line VII–VII of FIG. 2 and further showing a valve mounted on the block.

Figure 1:
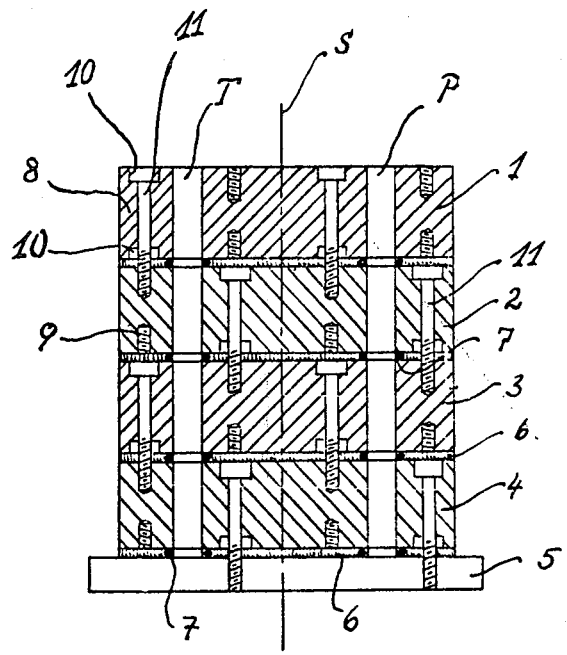
FIG. 1 is a vertical sectional view in schematic form of a manifold block assembly.

A manifold assembly according to this invention is shown schematically in FIG. 1 and comprises four identical blocks: 1, 2, 3 and 4 mounted on a mounting or base plate 5. Although all of the blocks are identical: alternate blocks, such as 1 and 3, are inverted with respect to the other blocks 2 and 4. Each of the blocks has through fluid conduits T and P, which are aligned in the assembly to form through fluid passages T and P. Conduits T and P are equally spaced about a plane of symmetry S extending through each block and thus the assembly, as will be later described. Each of the blocks is spaced from its adjacent block by a gasket 6 and the conduits T and P are sealed by O-rings 7. The blocks are connected together by novel fastening means as will now be described with reference to FIGS. 1, 2 and 3.

Figure 2:
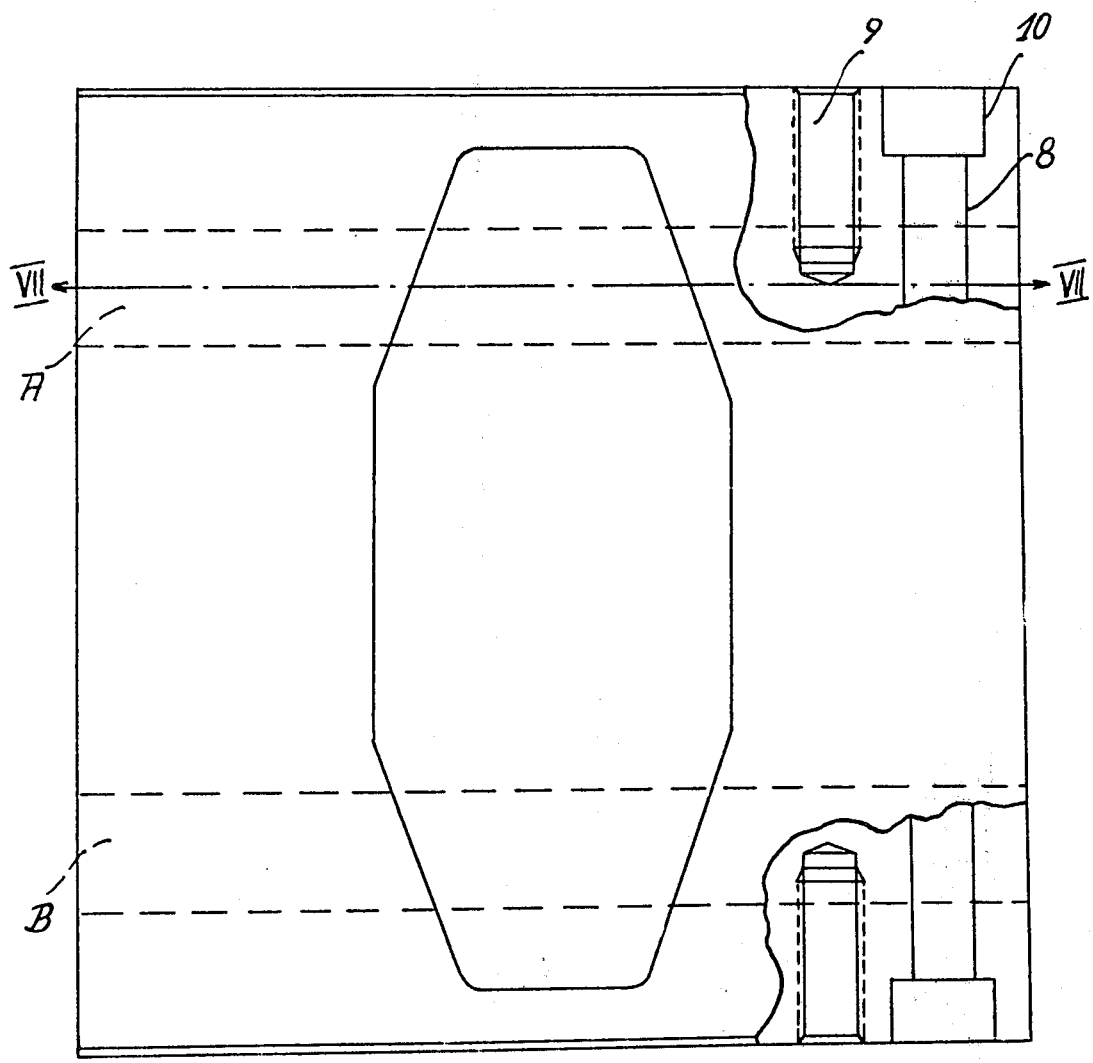
FIG. 2 is a front view of a single block for a manifold block assembly according to the invention.
Figure 3:
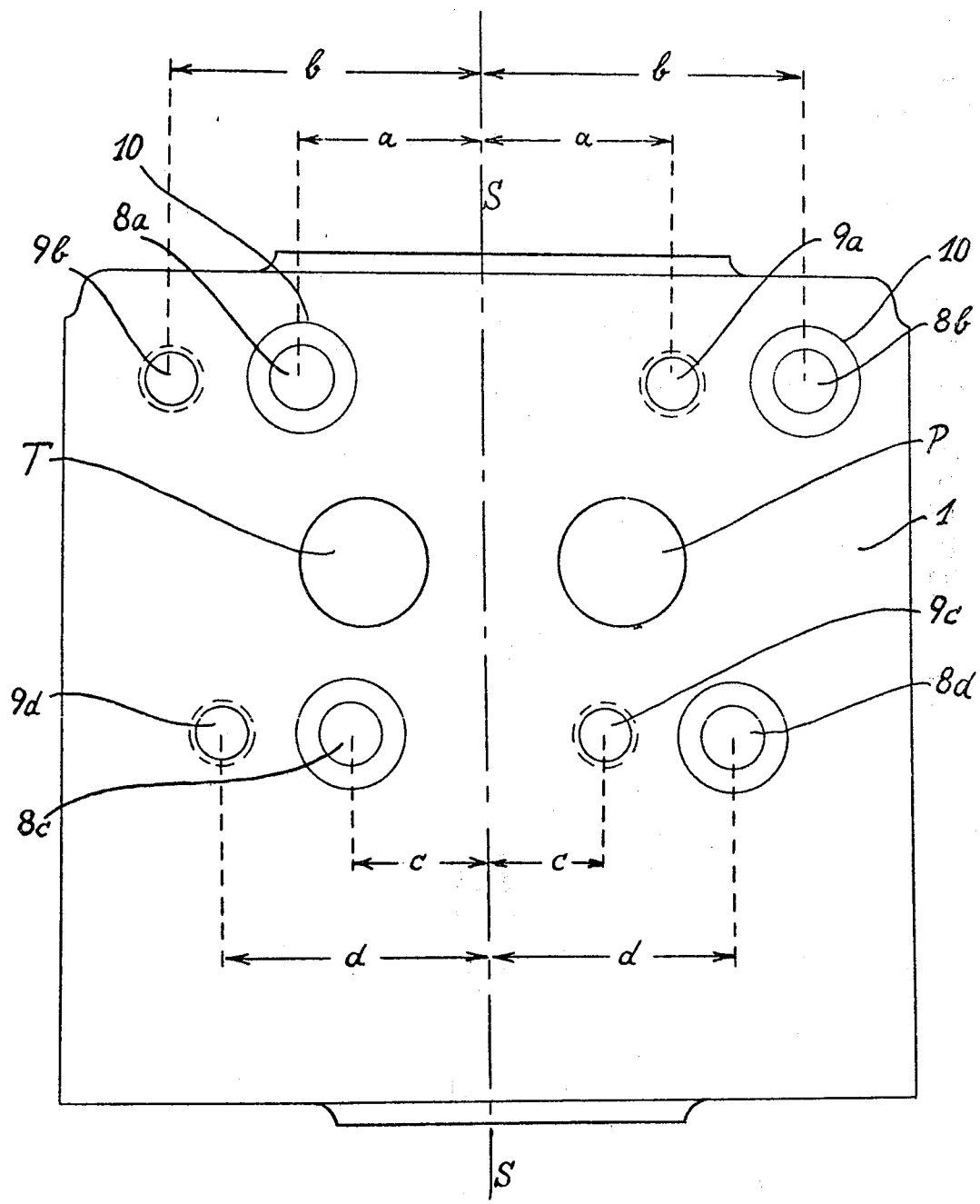
FIG. 3 is a top view of the block shown in FIG. 2.

Each of the blocks is provided with fastening bores in matable pairs denoted 8 and 9. As shown in FIGS. 1 and 2, the bores 9 are threaded and each extend inwardly of each block face and the bores 8 are unthreaded and extend through the blocks between the faces. Each one of the pairs of bores are spaced equidistant from the symmetry plane S, such that bores 8a and 9a are spaced a distance a from plane S, while bores 8b and 9b are spaced a distance b from S. Similarly, bores 8c and 9c and bores 8d and 9d are spaced respective distances c and d from plane S.

The use of alternately inverted identical blocks enables effective simplified assembly. Thus, inversion of one block shown in FIG. 3 with respect to another block produces mating alignment of bores 8a and 9a, 8b and 9b, 8c and 9c, and 8d and 9d, as shown in FIG. 1. The bores 8 are countersunk at either end as best shown in FIG. 2 to enable adjacent blocks to be bolted together. Thus a bolt 11 inserted through a bore 8 into threaded engagement with an aligned bore 9 will enable adjacent blocks such as 1 and 2 and FIG. 1 to be securely bolted together. Since four pairs of the fastening bores are provided in each block, a total of four bolts will securely fasten adjacent blocks together to form the stack shown in FIG. 1. Since the bolts 11 lie closely adjacent the fluid conduits T and P, good sealing characteristics are obtained.

In this manner a stack of infinite height can be provided to enable any particular valve configuration with a single manifold assembly, as will now be described with reference to FIGS. 2, 4 and 5.

Figure 4:
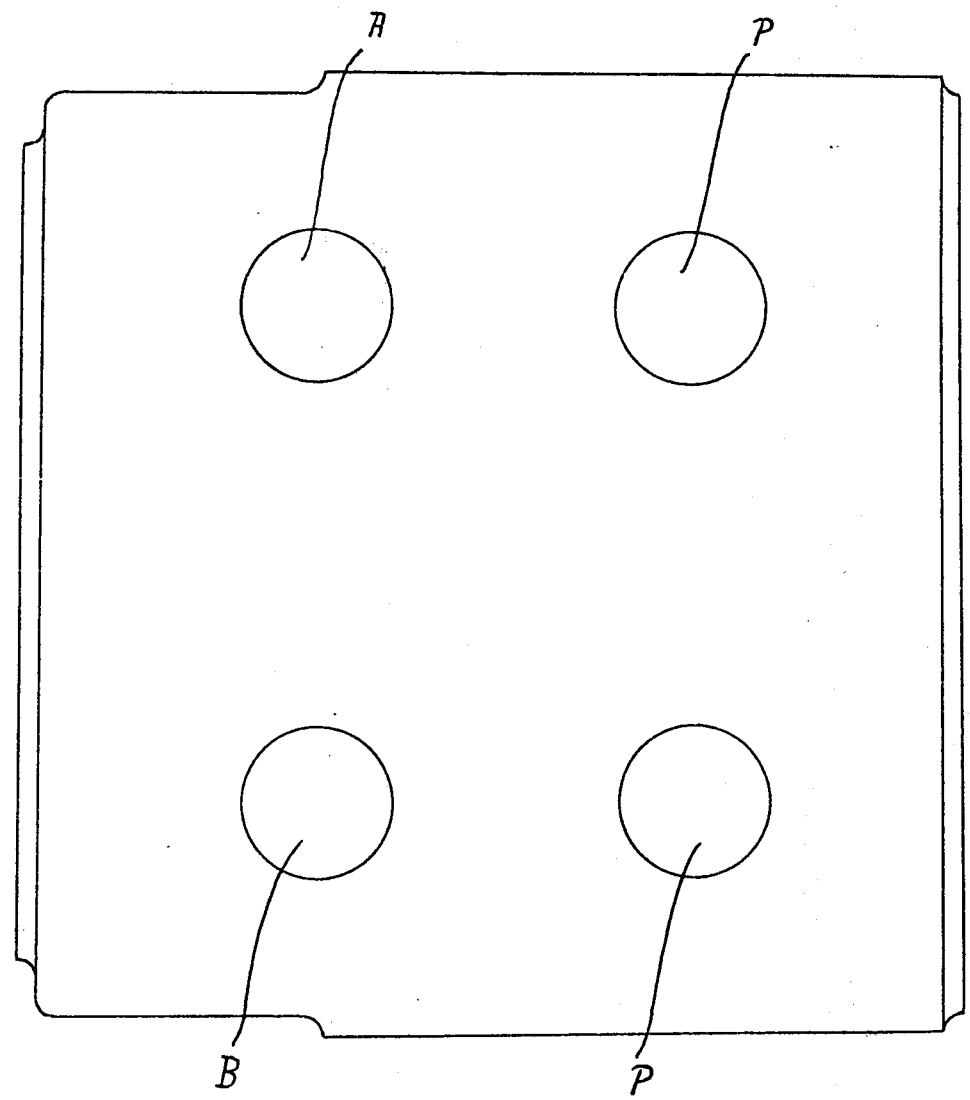
FIG. 4 is a right side view of the block shown in FIG. 2.
Figure 5:
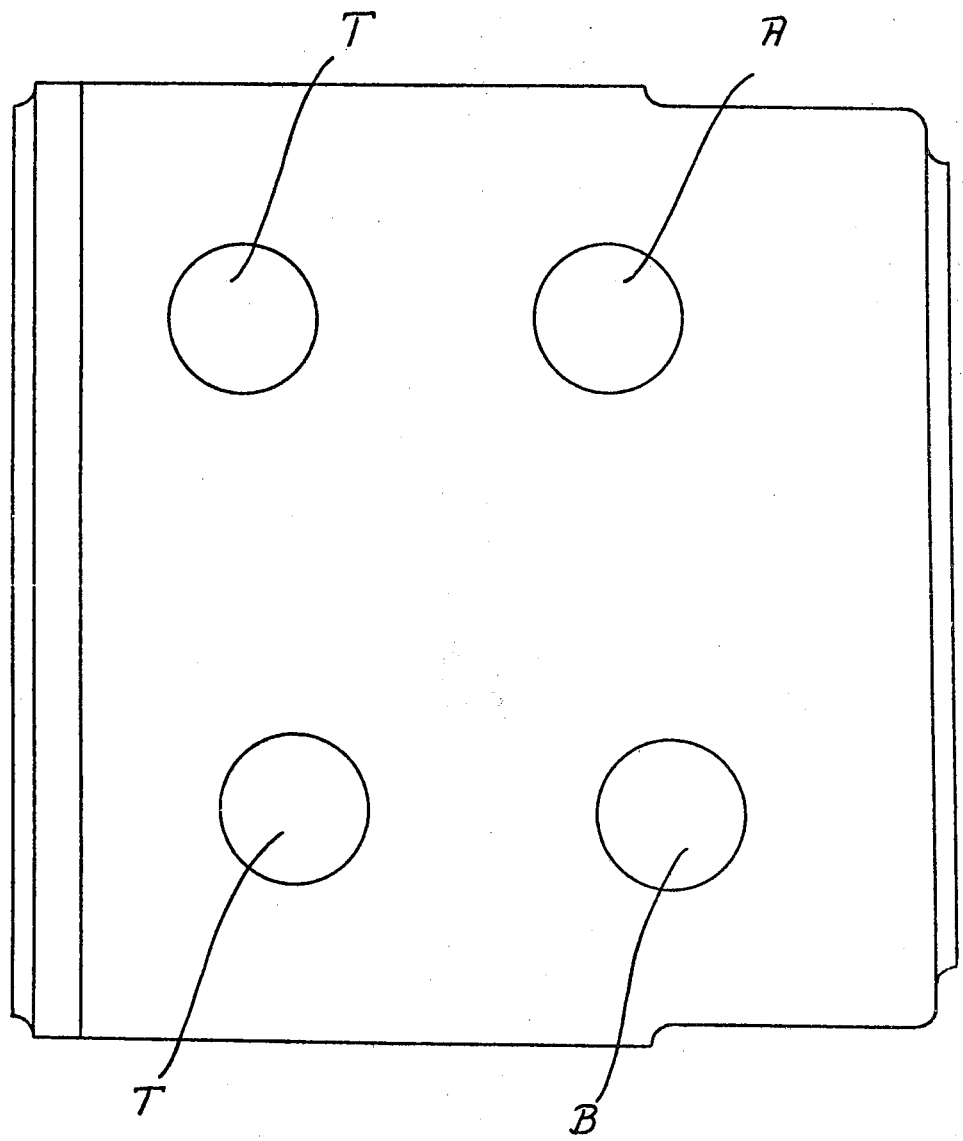
FIG. 5 is a left side view of the block shown in FIG. 2.
Figure 6:
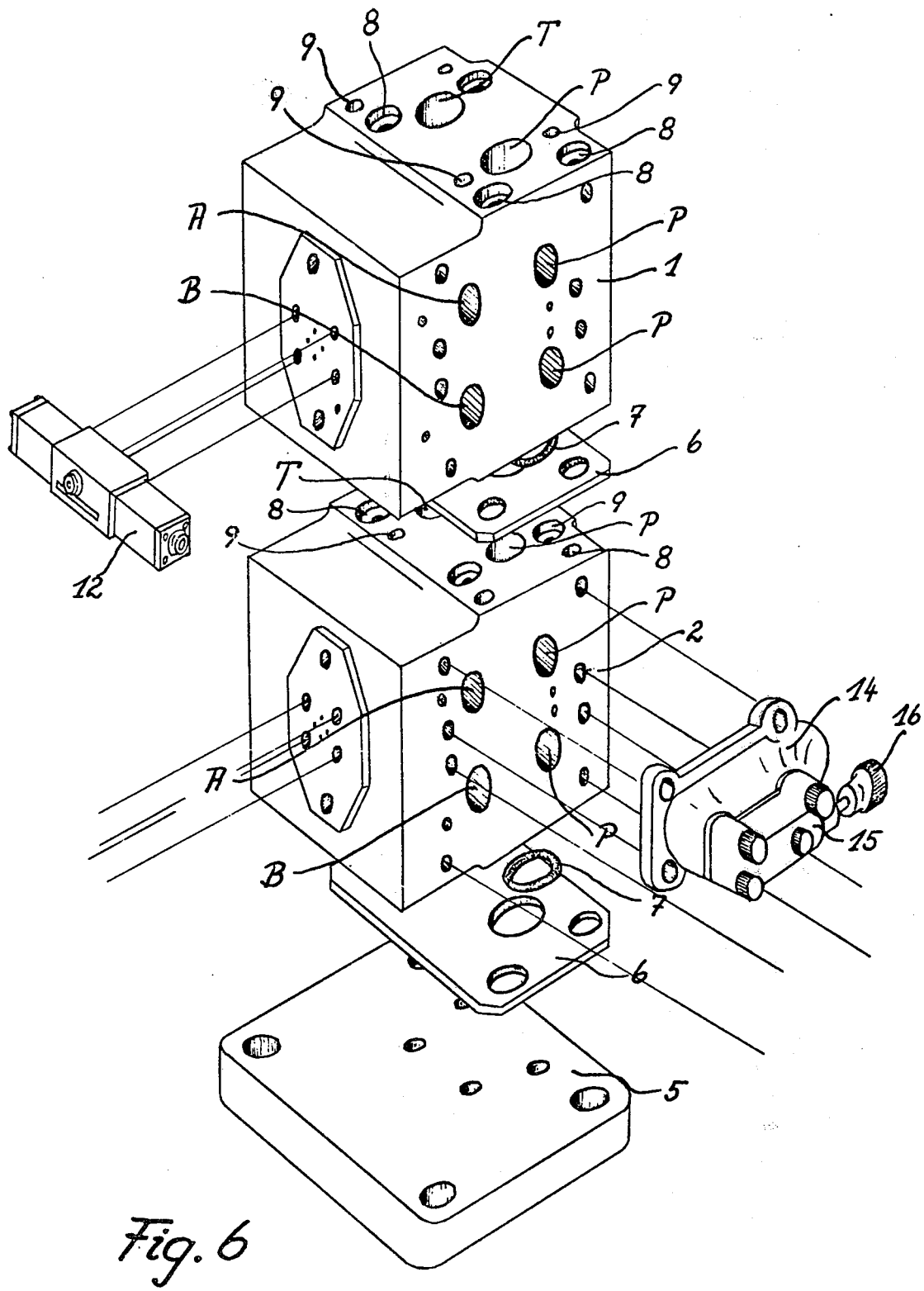
FIG. 6 is an exploded view of a two-block manifold block assembly.

Each of the blocks is provided with lateral through fluid control passages denoted A and B and lateral branch passages P and T, as shown in FIGS. 4 and 5. Passages P and T connect with main passages P and T shown in FIG. 1. FIG. 7 shows that branch passages such as A interconnect with the through fluid control passages A and B. These lateral and branch passages are adapted to be mated with valves such as four-way solenoid valve 12 and pilot control valve 14, 15, 16 shown in FIG. 6. Of course, any number of passages may be provided in the individual blocks to permit an almost infinite variety of valve functions to be accomplished by mounting various valves and selectively plugging various passages on each block.

It will be noted that none of the valves are actually mounted in the manifold blocks themselves but are, instead, mounted exteriorly of the manifold blocks. Thus, a change in function of a particular valve in a block may be accomplished by merely mounting a different type of valve and different porting plugs on each valve block. This enables the use of a plurality of standardized valve units, all of which are mounted on identical standard manifold blocks which are fastened together in a novel manner to provide increased flexibility and simplicity of manufacture and inventory.

The great advantage of this invention is that each of the blocks is securely fastened to its adjacent block by the simple expedient of common bolts. This eliminates the need for excessively long tie rods in a valve stack of several blocks and also eliminates the necessity of utilizing external flanges and external hardware to interconnect a manifold assembly. Thus, since each block is bolted only to its immediate adjacent block at points adjacent the through main fluid conduits, an extremely secure slamping fit between adjacent blocks is achieved, thus enabling the use of much higher pressures in a manifold assembly than previously.

It is obvious that variations from the described specific embodiment could be made without departing from the scope of the invention. Thus, fastening means other than threaded bores and bolts could be used and the threaded bores 9 could be tapped completely through each block, although the disclosed embodiment is preferred. These and further modifications may be made to the disclosed embodiment without departing from the spirit and scope of the invention as defined by the following claims.

What is claimed is:

1. A hydraulic manifold assembly comprising a pair of blocks each having identical first mounting faces and identical second mounting faces formed thereon, a pair of main fluid conduits which extend between the faces and are located equidistant from opposite sides of a plane of symmetry extending through the block to provide continuous main fluid passages through the blocks when the first faces or the second faces are mounted together, and fastening means comprising a through-bore extending between the faces, a threaded bore extending inward from each face in each block, said bores being located equidistant from opposite sides of said plane to mate a through-bore of one block with a threaded bore of the other block when the first faces are mounted together, and a bolt engaging one block adjacent its second-face, extending through its through-bore and engaging the threaded bore on the first face of the other block to clamp the blocks together.

2. The hydraulic manifold assembly of claim 1, wherein the fastening means include second through- and threaded-bores each located equidistant from opposite sides of said symmetry plane and a second bolt extending through the second through-bore and engaging the other block second threaded-bore to clamp the blocks together.

3. The hydraulic manifold assembly of claim 2, wherein each block has a plurality of control fluid passages formed therein and branch fluid passages connecting the main and control passages with the sides of the blocks for connection to valve means mounted exteriorly of the blocks.

4. The hydraulic manifold assembly of claim 2, wherein the fastening means comprise third through-and-threaded bores each located equidistant from opposite sides of said symmetry plane and fourth through-and-threaded bores each located equidistant from opposite sides of said symmetry plane so the first and third through-bores and the second and fourth threaded-bores are all located on the same side of the symmetry plane, and wherein each through-bore is countersunk at both ends to receive a bolt head.

* * * * *